United States Patent [19]

Delany

[11] Patent Number: 4,701,196
[45] Date of Patent: Oct. 20, 1987

[54] AIR FILTER ASSEMBLY

[75] Inventor: John J. Delany, Madison, Wis.

[73] Assignee: Research Products Corporation, Madison, Wis.

[21] Appl. No.: 906,928

[22] Filed: Sep. 15, 1986

[51] Int. Cl.⁴ .............................................. B01D 46/52
[52] U.S. Cl. ....................................... 55/481; 55/500; 55/504; 55/521; 55/DIG. 31
[58] Field of Search ................ 55/478, 481, 493, 497, 55/500, 504, 510, 521, DIG. 31

[56] References Cited

U.S. PATENT DOCUMENTS

| | | | |
|---|---|---|---|
| 2,081,553 | 5/1937 | Neeson | 55/481 X |
| 3,438,180 | 4/1969 | Klouda | 55/481 X |
| 3,494,113 | 2/1970 | Kinney | 55/481 |
| 3,789,589 | 2/1974 | Delany et al. | 55/481 |
| 3,793,813 | 2/1974 | McAllister | 55/481 |
| 3,823,926 | 7/1974 | Bracich | 55/504 X |
| 4,488,888 | 12/1984 | Doyle | 55/481 |

Primary Examiner—Charles Hart
Attorney, Agent, or Firm—Andrus, Sceales, Starke & Sawall

[57] ABSTRACT

An air filter assembly (1) includes an outer casing (6) having end, rear and downstream portions which are generally planular and thus easily settable on the floor during installation, with the downstream portion being mountable flush to a furnace (3) or the like. An inner filter-holding drawer (7) is provided for easy insertion and removal from the open front casing portion. At least one end wall (10, 11) of the casing is provided with a springable latch (34) adjacent the casing front opening and which snappingly engages and holds a cover (9) in place when the drawer is within the casing. The drawer end walls (44, 45) include external grooves (52) which slide over rails (56) correspondingly mounted internally of the casing side walls. The tolerances are such that the grooves are wider than the rails. Protrusions (59) are disposed on the downstream sides of the rail rear end portions and are engaged by the downstream groove edges (55) as the drawer reaches its rearmost position, thus forcing the drawer's rear end portion downstream so that the grooves' rear upstream edges (54) move into sealing engagement with the upstream rear end portions (57) of the rails. A cam (60) is disposed on the downstream groove sides of the drawer at their front end portions, the cam forcing the drawer's front end portion to move transversely on the rails in a downstream direction so that the upstream front edge portions of the grooves seal against the rails. The downstream shifting of the drawer compliments the operating air flow downstream through the unit, thus sealing the upstream sealing surfaces.

8 Claims, 7 Drawing Figures

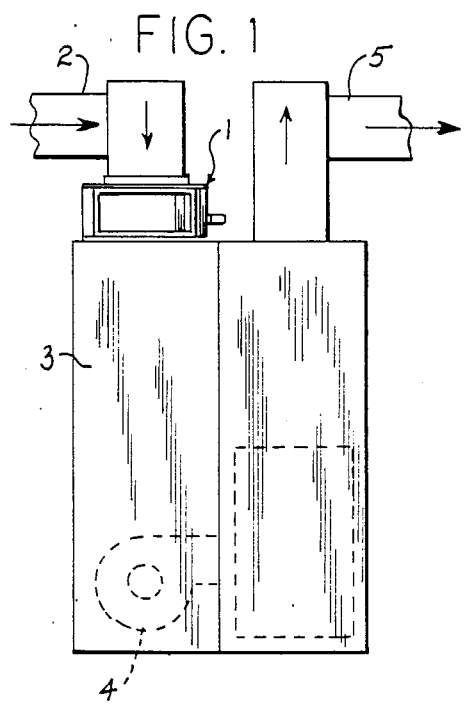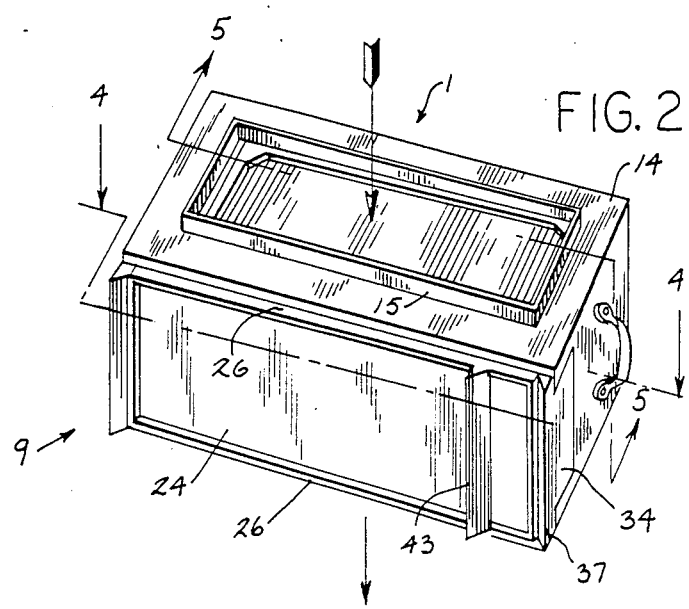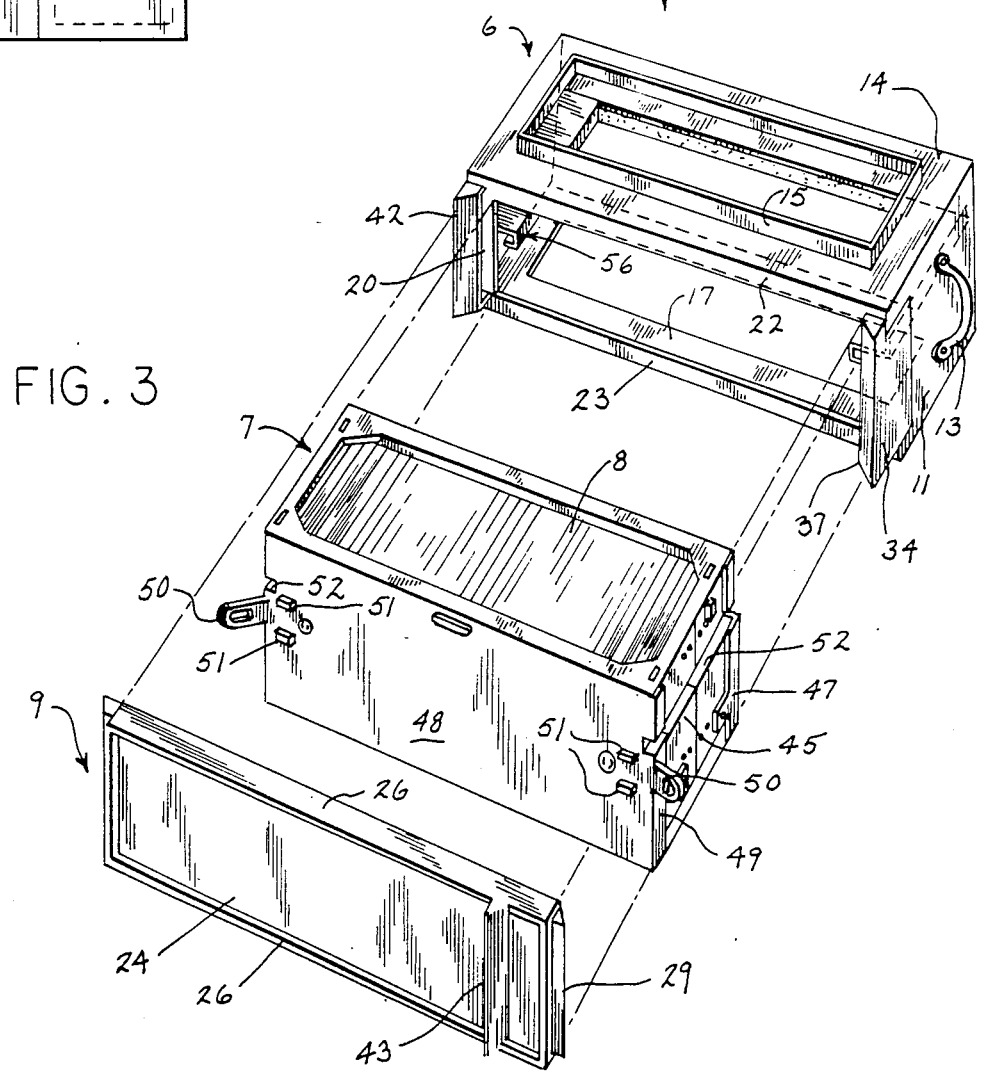

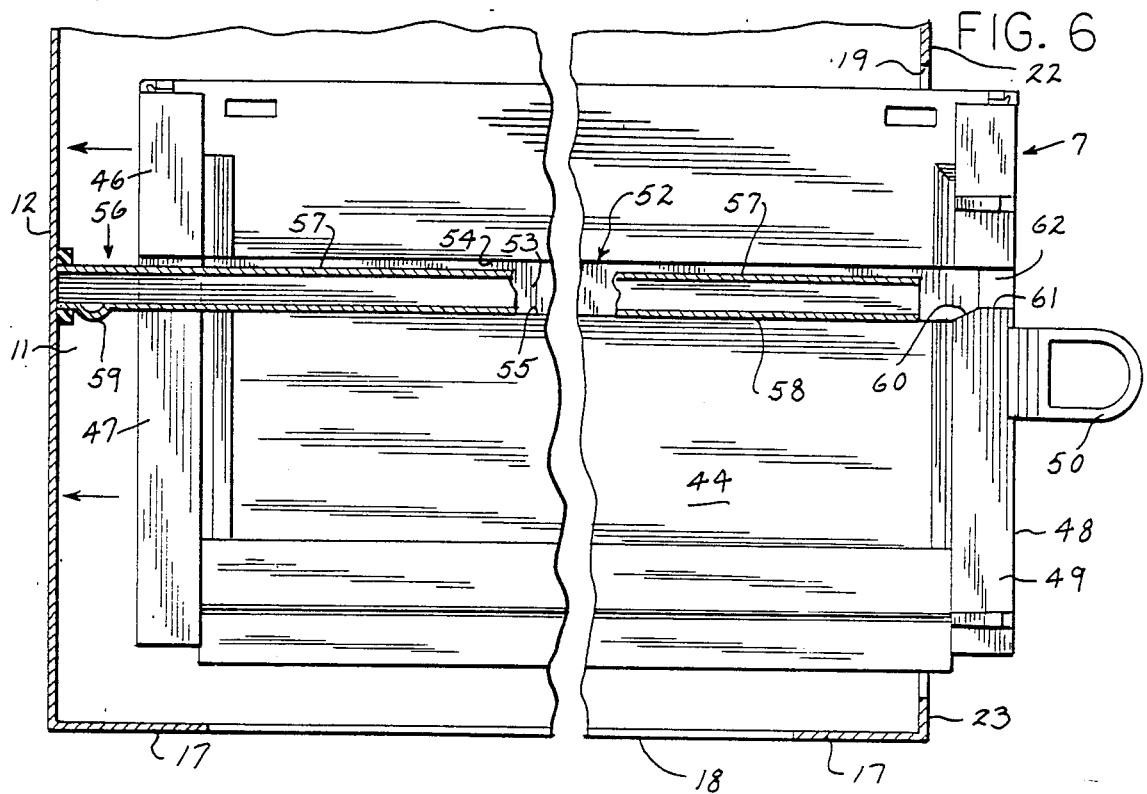
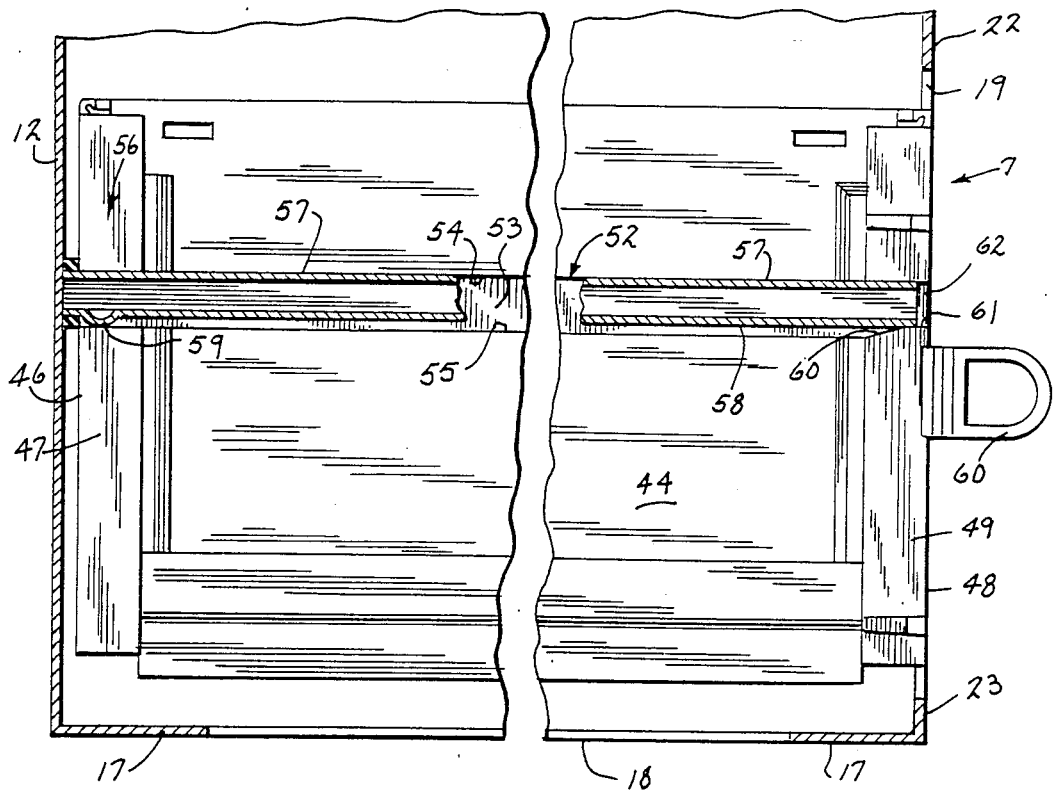

AIR FILTER ASSEMBLY

BACKGROUND AND SUMMARY OF THE INVENTION

This invention relates to an air filter assembly, and is an improvement over U.S. Pat. No. 3,789,589 entitled "High Performance Filter Assembly" and assigned to a common assignee.

The aforementioned U.S. patent discloses a filter assembly for use with air treating systems such as furnaces and the like which included an outer casing 6 for attachment to the return air duct of a funance. An inner drawer 7 having a front and rear door was removably mounted in the casing for sliding movement therein, and mounted a filter media of the high efficiency type. A combination of stop bars 59 and lugs 60, together with a special dimensioning of the front drawer door 30 as compared to the rear drawer door 31, prevented inadvertent installation of the drawer backwards or in inverted position. Furthermore, the casing door of the prior patent was secured in place by tightening nuts 18.

In addition and in the prior patent, when the drawer was inserted into the casing and reached the end of its inward travel, suitable camming devices 62 and 63 on the drawer doors cooperated with a downstream casing flange 12 to shift the drawer in an upstream direction to effect a seal with the casing.

The casing of the prior patent was constructed with perpendicular flanges 13 and 14 disposed around its upstream and downstream openings for securement to suitable ductwork. Also, the casing cover 10 protruded outwardly beyond the casing sides.

Although the prior filter assembly has had substantial commercial success over the years, it was designed to be made of metallic material, which caused the assembly to be rather heavy and thus somewhat difficult to install and work with. It thus has recently become desirable to develop a filter assembly of the general type disclosed in the afornentioned patent, but which could incorporate numerous plastic parts and have a more advantageous construction, such as being mountable flush to the furnace, being lighter in weight, and being simplified and less costly to manufacture. The present invention is directed to providing such an improved assembly.

In accordance with the various aspects of the present invention, an air filter assembly includes an outer casing having end, rear and downstream portions which are generally planular and thus easily settable on the floor during installation, with the downstream portion being mountable flush to a furnace or the like. An inner filter-holding drawer is provided for easy insertion and removal from the open front casing portion. At least one end wall of the casing is provided with a springable latch adjacent the casing front opening and which snappingly engages and holds a cover in place when the drawer is within the casing.

The drawer may be made of plastic and its end walls include external grooves which are adapted to slide over rails correspondingly mounted internally of the casing side walls. The tolerances are such that the grooves are wider than the rails so that the drawer is easily slideable within the casing.

Protrusions are disposed on the downstream sides of the rail rear end portions and are engaged by the downstream groove edges as the drawer reaches its rearmost position, thus forcing the drawer's rear end portion downstream so that the groove's rear upstream edges move into sealing engagement with the upstream rear end portions of the rails. Likewise, a cam is disposed on the downstream groove sides of the drawer at their front end portions, the cam forcing the drawer's front end portion to move transversely on the rails in a downstream direction so that the upstream front end edge portions of the grooves seal against the rails. The downstream shifting of the drawer compliments the defect of the air pressure during operation of the unit, said air pressure tending to also force the drawer downstream, thus sealing the upstream sealing surfaces.

BRIEF DESCRIPTION OF THE DRAWINGS

The accompanying drawings illustrate the best mode presently contemplated by the inventor for carrying out the invention.

Arrows on the drawing figures denote the direction of internal air movement.

In the drawings:

FIG. 1 is a front elevation of a forced air furnace and accompanying ductwork incorporating the assembly of the invention;

FIG. 2 is a front perspective view of the assembled unit;

FIG. 3 is an exploded front perspective view of the assembly;

FIG. 4 is a horizontal section taken on line 4—4 of FIG. 2;

FIG. 5 is a vertical section taken on line 5—5 of FIG. 2;

FIG. 6 is a vertical section taken on line 6—6 of FIG. 5 and showing the drawer being inserted into the casing; and FIG. 7 is a view similar to FIG. 6 and showing the drawer in its final position within the casing.

DESCRIPTION OF THE PREFERRED EMBODIMENT

Figure 4:
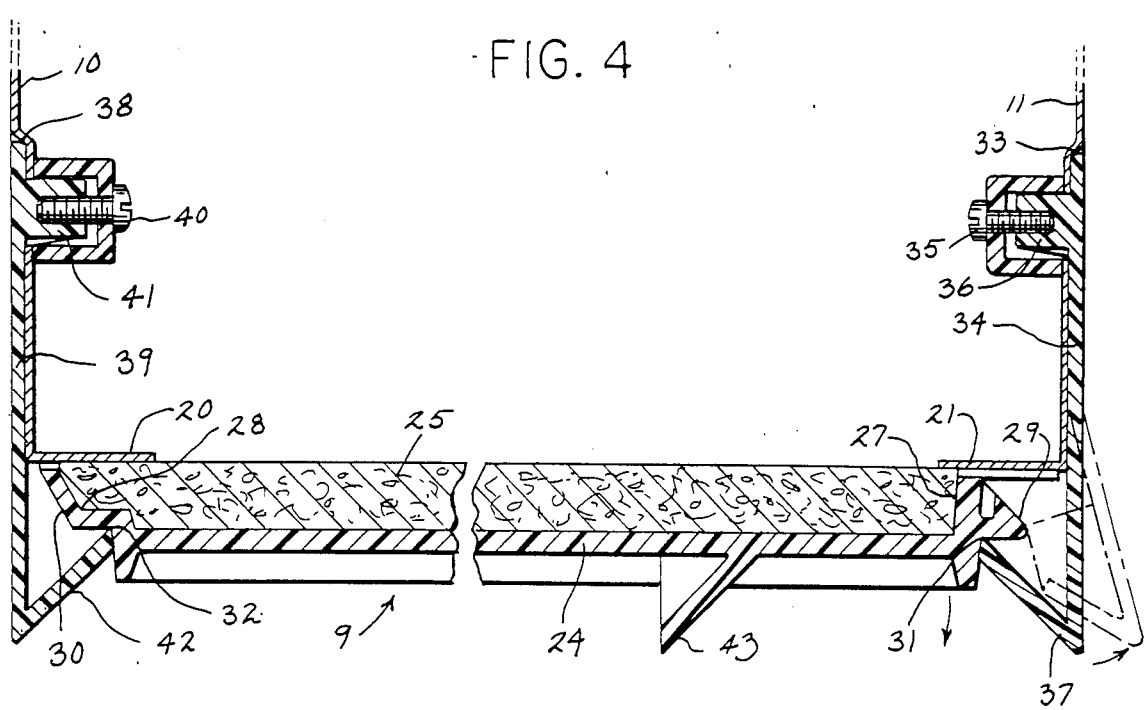
Figure 5:
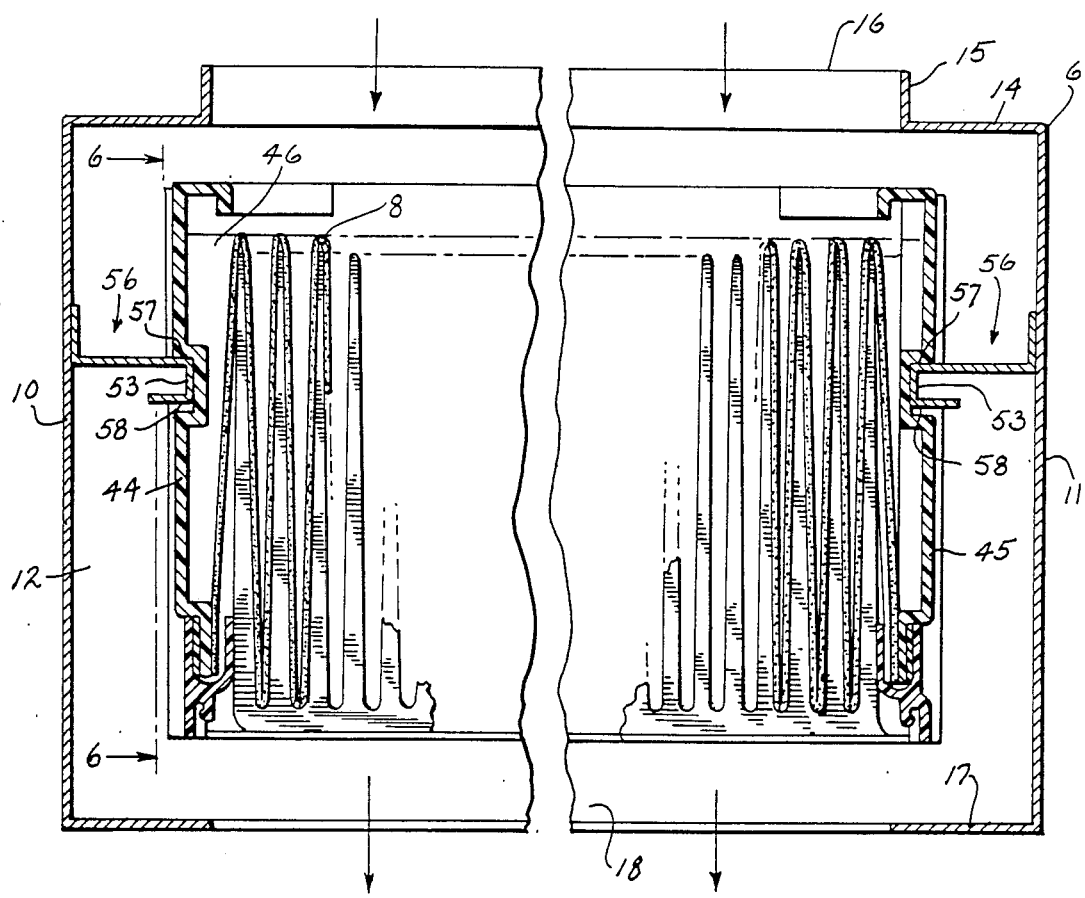

As shown generally in FIGS. 1-3 of the drawings, the various aspects of the invention are embodied in a high performance filter assembly 1 adapted to be mounted in the air return duct 2 of an air treating apparatus, such as a furnace 3 having an air blower 4 and hot air discharge duct 5. Assembly 1 comprises a generally rectangular outer casing 6, a generally rectangular inner drawer 7 and a high efficiency filter 8 mounted within the drawer. Filter 8 is of the pleated type and may be mounted similarly as in the aforementioned U.S. Pat. No. 3,789,589. A cover 9 is adapted to be secured to casing 6, once drawer 7 is in place therewithin.

Outer casing 6 includes a generally planar spaced end walls 10, 11 which extend from front to rear of the casing, as well as a generally planar rear wall 12 which joins the rear edges of the end walls. If desired, a carrying handle 13 may be suitably mounted to one of the end walls, such as wall 11.

The upstream edges of walls 10-12 are flanged peripherally inwardly, as at 14, with the latter merging into a further perpendicular peripheral flange 15 for securement to air return duct 2. The peripheral flanges 14 and 15 form an air inlet 16 for the unit. Likewise, the downstream edges of walls 10-12 are also flanged inwardly to provide a peripheral flange 17 which forms the air outlet 18 for the unit. Flange 17 forms a bottom wall for casing 6 which, while open at its center, is generally planar.

The planar construction of walls 10-12 as well as the casing bottom wall formed by flange 17 facilitates standing of the assembly on the floor during installation, and also permits flush mounting of the assembly bottom and outlet 18 directly to furnace 3, as shown in FIG. 1.

Casing 6 is also provided with a front opening 19 which is adapted to receive drawer 7 therethrough. For this purpose, opening 19 is dilineated by inwardly transversely extending flanges 20, 21 on the front edges of the respective end walls 10 and 11; a downwardly extending flange 22 on the front edge of peripheral flange 14; and finally an upwardly extending flange 23 on the front edge of peripheral flange 17.

Referring particularly to FIGS. 2-4, cover 9 is adapted to form a closure for front opening 19 when drawer 7 is in place. Cover 9 may be made of relatively rigid yet slightly flexible molded plastic of any suitable well-known type and comprises an elongated rectangular body 24 having an internal recess for mounting a blanket or pad 25 of filter-like sealing material therein. The recess is formed by a pair of spaced side flanges 26 joined by a pair of end flanges 27 and 28 respectively. The edges of side flanges 26 are adapted to abut upper and lower casing flanges 22 and 23 when front opening 19 is closed. A tapered or inclined lip 29 extends outwardly along the outer portion of one end flange 27, while the other end flange 28 itself is formed to also provide an outwardly extending tapered or inclined lip 30. Lips 29 and 20 extend in opposite directions from the plane of cover body 24—that is, lip 29 extends toward body 24, while lip 30 extends away from the body. Lips 29 and 30 also form shoulders 31, 32 with their respective flanges 27 and 28, for purposes to be described.

In accordance with an aspect of the invention, access cover 9 is adapted to be removably attached to casing 6 in a unique manner. For this purpose, at least one end wall 10, 11 is provided with latching means cooperating with the latching means formed by the heretofore described cover construction. The present embodiment utilizes both end walls 10 and 11. Referring to FIG. 4, the front end portion of end wall 11 is set back, as at 33, and a thin panel 34 is disposed in the set back recess and held in place, as by a bolt 35 threaded into an internal boss 36 on panel 34. Panel 34 extends forwardly from front casing flange 21 and is provided with a reverse-bent lip 37, the edge of which is adapted to latchingly engage shoulder 31. Likewise, the front end portion of end wall 10 is also set back, as at 38, and a thin panel 39 is disposed in the set back recess and held in place, as by a bolt 40 threaded into an internal boss 41 on panel 39. Panel 39 also extends forwardly from its respective front casing flange 20 and is provided with a reverse-bent lip 42, the edge of which is adapted to latchingly engage shoulder 32.

It should be noted that the recessed position of panels 34 and 39 does not disrupt the planarity of casing end walls 11 and 10 respectively so that the assembly can be sat on end if desired.

Cover 9 is shown as having a recessed hand grip 43 which is used in a manner to be described.

To assemble cover 9 to casing 6, the cover is inserted into the casing front behind panel 39 so that the cover shoulder 32 engages reverse-bent lip 42 of panel 39. The other end of cover 9 is then swung inwardly and pushed until inclined cover lip 29 rides over panel lip 37, thereby causing panel 34 to spring outwardly until lip 29 snaps behind lip 37 and into latching engagement with shoulder 31. See the phantom-lined portion of FIG. 4. To remove cover 9 from its latched position of FIG. 4, hand grip 43 is grasped and pulled in the direction of panel 34, which again causes the panel to springingly flex outwardly until shoulder 31 is disengaged from lip 37 and lip 29 releasingly rides over the latter, at which point panel 34 springs back to its normal position. Cover 9 can then be releasably lifted from the other end.

The cooperative latching construction is such that cover 9 can be reversed in position and quickly latched or unlatched from either end for purposes of convenience.

Inner drawer 7 may be constructed of molded plastic for lightness in weight and economy of manufacture and generally comprises end walls 44, 45 which join a rear wall 46 which has forwardly extending flanges 47 at each end which overlap the end walls; and also join a front wall or door 48 which has rearwardly extending flanges 49 at each end which overlap the end walls. Pivotable living hinge-type handles 50 are integrally mounted at the door ends to enable the operator to easily pull drawer 7 out from within casing 6. A pair of spaced catches 51 are disposed on the front face of door 48 so that handles may be pivoted over to the plane of the door and snapped into the catches when not in use so that the handles do not interfere with application of the casing cover 9.

Means are provided so that drawer 7 may be slidingly guided into and out of casing 6 with ease. For this purpose, the ends of drawer 7 are provided with grooves 52 which extend from front to back, and which in the present embodiment are disposed in end walls 44 and 45 and also extend through rear flanges 47 and front flanges 49. The pair of grooves 52 include a recessed base portion 53 and upper and lower edges 54, 55 respectively.

Grooves 52 are adapted to receive and slideably mount on rails 56 which are mounted to and extend inwardly from casing end walls 10 and 11 respectively. Rails 56 also extend from front to back on casing 6, and are shown as including upper and lower face portions 57, 58 joined by a web 59.

As best seen in FIGS. 6 and 7, grooves 52 are wider than rails 56; that is, the distance between groove edges 54, 55 is greater than the distance between rail face portions 57, 58 respectively. The large tolerance thus provided permits easy sliding of drawer 7 within casing 6, and also assists in sealing the drawer to the casing.

Grooves 52 and rails 56 are offset or displaced in an upstream direction from the horizontal centerline of the assembly and when in registry, are in a horizontal plane. The result is that drawer 7 can be inserted in casing 6 when the drawer is right-side-up, but not upside-down, because the grooves and rails will only register in the right side up drawer position shown.

Referring further to FIGS. 6 and 7, means are provided to seal one pair of groove edges to the respective pair of adjacent rail face portions to essentially prevent leakage of air therearound. In the present embodiment, it is desired to take advantage of the downstream biasing force on drawer 7 caused by the internal air flowing in a downstream direction therethrough. Thus, it is desired to compliment the downstream air pressure force by also mechanically forcing drawer 7 in the same direction (downstream) as it reaches its rearmost position of travel during insertion.

For the above purpose, the mechanical downstream biasing occurs at both the front and rear of the device. As shown, a dimple-like projection 59 is disposed on the rearward ends of rails 56 and extends downwardly from lower face 58 a distance approximating the tolerance between groove edges 54, 55 and rail faces 57, 58. Projections 59 are adapted to cooperate with lower groove edges 55, as will be described. In addition, an inclined cam 60 is disposed on the forward ends of grooves 52 with the cams being formed in lower groove edges 55 and extending forwardly and also upwardly therefrom by a distance approximating the aforesaid tolerance. Cams 60 merge into straight edge portions 61 at the very forward groove ends, with portions 61 being parallel to and spaced from upper groove edges 54 a distance approximately equal to the distance between casing rail faces 57, 58, thus forming narrowed front end groove portions 62. Cams 60 are adapted to cooperate with rails 56, as will now be described.

FIG. 6 illustrates drawer 7 being slidingly inserted into casing 6 and disposed partially toward its innermost position. During this initial sliding movement, rails 56 will be relatively loosely disposed within grooves 52, the space shown therebetween in FIG. 6 being somewhat exaggerated for purposes of clarity. As drawer 7 reaches its rearmost position, and referring to FIG. 7, lower groove edges 55 engage projections 59 at the rear of casing 6, which forces the rear portion of drawer 7 in a downstream direction, thus sealing upper groove edges 54 against upper rail faces 57. At about the same time, cams 60 at the front of drawer 7 ride onto the lower faces 58 of the outer front ends of rails 56 of casing 6, which forces the front portion of drawer 7 in a downstream direction, thus further sealing upper groove edges 54 against upper rail faces 57. The outer ends of rails 56 enter the narrowed groove portion 62 and is confined between groove edges 54 and 61.

The result is that the interengaging upstream surfaces of grooves 52 and rails 56 are essentially sealed.

The aspects of the invention provide an improved and unique air filter assembly. Certain words used herein such as upstream, downstream, upper, lower, front, rear, etc. could be interchanged without departing from the spirit of the invention.

Various modes of carrying out the invention are contemplated as being within the scope of the following claims particularly pointing out and distinctly claiming the subject matter which is regarded as to the invention.

I claim:

1. An air filter assembly (1) for connection to a duct (2) of an air treating system (3) wherein air flows from upstream to downstream, said assembly comprising, in combination:
   (a) a generally rectangular outer casing (6) for mounting to the said duct, said casing being open on its upstream and downstream portions as well as on its front portion,
   (b) said casing having end walls (10, 11) joining a rear wall (12), and having a bottom downstream wall (17), said walls being generally planar,
   (c) a generally rectangular inner drawer (7) adapted for insertion and removal through said casing's open front portion (19),
   (d) said drawer having end walls (44, 45) joining a front wall (48) and a rear wall (46),
   (e) a filter (8) disposed in said drawer,
   (f) a cover (9) for closing said front casing portion when said drawer is disposed within said casing,
   (g) cooperative latch means (29–42) on the ends of said cover (9) and said casing end walls (10, 11) for removably latching said cover to the said casing front portion, said latch means being constructed so that said cover is reversibly attachable to said casing,
   (h) grooves (52) disposed in said drawer end walls (44, 45) and extending rearwardly from the front of said drawer,
   (i) rails (56) disposed on said casing end walls (10, 11) and extending rearwardly from the front of said casing, said rails being rceivable within said grooves so tha said drawer is slideable along said rails,
   (j) said grooves (52) and rails (56) being registerable only when said drawer (7) is in a right-side-up position relative to said casing (6),
   (k) and cooperative biasing means (59, 60) on said casing and said drawer to force the front and rear portions of said drawer downstream when said drawer is slid to its rearmost position within said casing, so that the upstream portions (54, 57) of said grooves and rails are sealingly engaged,
   (l) said cooperative latch means comprising:
      (1) first inclined lip means (29, 30) disposed on said ends of said cover (9),
      (2) shoulder means (31, 32) disposed adjacent said cover lip means,
      (3) and panel means (34, 39) set back into the plane of said casing end walls (11, 10) and with said panel means extending forwardly of said casing and including second inclined lip means (37, 42) engageable with said shoulder means,
      (4) said panel means being springably flexible so that as an end of said cover is pressed rearwardly, a said first lip means (29, 30) rides over said second lip means (37, 42) and snaps into place in engagement with a said shoulder means (31, 32).

2. The air filter assembly of claim 1 wherein:
   (a) said drawer grooves (52) include a pair of spaced upstream and downstream edges (54, 55) and said casing rails (56) include a pair of spaced upstream and downstream faces (57, 58),
   (b) the distance between said edges being greater than the distance between said faces,
   (c) said cooperative biasing means comprising:
      (1) a downstream facing projection (59) disposed at the rear ends of said downstream rail faces (58) and engageable by said downstream groove edges (55) to force the rear portion of said drawer downstream as said drawer reaches its rearmost travel position,
      (2) and an inclined cam (60) disposed at the front ends of said downstream drawer groove edges (55) and engageable by said downstream rail faces (58) to force the front portion of said drawer downstream as said drawer reaches its rearmost travel position,
      (3) downstream movement of said drawer portions causing sealing engagement between said upstream groove edges (54) and said upstream rail faces (57).

3. The air filter assembly of claim 2 or 1 wherein said drawer grooves (52) and said casing rails (56) are displaced in the same direction from the horizontal center line of the assembly so that said grooves and rails do not register when said drawer is in an upside-down position relative to said casing.

4. The air filter assembly of claim 3 in which said drawer grooves (52) and said casing rails (56) are displaced upstream from the horizontal center line of the assembly.

5. The air filter assembly of claim 1 wherein said cooperates biasing means (59, 60) mechanically complements the force of said upstream-todownstream air flow.

6. An air filter assembly (1) for connection to a duct (2) of an air treating system (3) wherein air flows from upstream to downstream, said assembly comprising, in combination:
 (a) a generally rectangular outer casing (6) for mounting to the said duct, said casing being open on its upstream and downstream portions as well as on its front portion,
 (b) said casing having end walls (10, 11) joining a rear wall (12),
 (c) a generally rectangular filter holding inner drawer (7) adapted for insertion and removal through said casing's open front portion (19),
 (d) a cover (9) for closing said casing's open front portion when said drawer is disposed within said casing,
 (e) cooperative latch means on the ends of said cover (9) and said casing end walls (10, 11) for removably latching said cover to the said casing front portion, said cooperative latch means comprising:
  (1) first inclined lip means (29, 30) disposed on at least one end of said cover (9),
  (2) shoulder means (31, 32) disposed adjacent said cover lip means,
  (3) panel means (34, 39) set back into the plane of at least one said casing end wall (11, 10) and with said panel means extending forwardly of said casing and including second inclined lip means (37, 42) engageable with said shoulder means,
  (4) said panel means being springably flexible so that as an end of said cover is pressed rearwardly, a said first lip means (29, 30) rides over said second lip means (37, 42) and snaps into place in engagement with a said shoulder means (31, 32).

7. The air filter assembly of claim 6 in which:
 (a) said cooperative latch means is disposed at both ends of said cover (9) and at both said casing end walls (10, 11),
 (b) said cover being reversibly attachable to said casing (6).

8. An air filter assembly (1) for connection to a duct (2) of an air treating system (3) wherein air flows from upstream to downstream, said assembly comprising, in combination:
 (a) a generally rectangular outer casing (6) for mounting to the said duct, said casing being open on its upstream and downstream portions as well as on its front portion,
 (b) said casing having end walls (10, 11) joining a rear wall (12), and having a bottom downstream wall (17), said walls being generally planar,
 (c) a generally rectangular inner drawer (7) adapted for insertion and removal through said casing's open front portion (19),
 (d) said drawer having end walls (44, 45) joining a front wall (48) and a rear wall (46),
 (e) a filter (8) disposed in said drawer,
 (f) a cover (9) for closing said front casing portion when said drawer is disposed within said casing,
 (g) cooperative latch means (29-42) on the ends of said cover (9) and said casing end walls (10, 11) for removably latching said cover to the said casing front portion, said latch means being constructed so that said cover is reversibly attachable to said casing,
 (h) grooves (52) disposed in said drawer end walls (44, 45) and extending rearwardly from the front of said drawer,
 (i) rails (56) disposed on said casing end walls (10, 11) and extending rearwardly from the front of said casing, said rails being rceivable within said grooves so tha said drawer is slideable along said rails,
 (j) said grooves (52) and rails (56) being registerable only when said drawer (7) is in a rightside-up position relative to said casing (6),
 (k) and cooperative biasing means (59, 60) on said casing and said drawer to force the front and rear portions of said drawer downstream when said drawer is slid to its rearmost position within said casing, so that the upstream portions (54, 57) of said grooves and rails are sealingly engaged,
 (l) said drawer grooves (52) include a pair of spaced upstream and downstream edges (54, 55) and said casing rails (56) include a pair of spaced upstream and downstream faces (57, 58),
 (m) the distance between said edges being greater than the distance between said faces,
 (n) said cooperative biasing means comprising:
  (1) a downstream facing projection (59) disposed at the rear ends of said downstream rail faces (58) and engageable by said downstream groove edges (55) to force the rear portion of said drawer downstream as said drawer reaches its rearmost travel position,
  (2) and an inclined cam (60) disposed at the front ends of said downstream drawer groove edges (55) and engageable by said downstream rail faces (58) to force the front portion of said drawer downstream as said drawer reaches its rearmost travel position,
  (3) downstream movement of said drawer portions causing sealing engagement between said upstream groove edges (54) and said upstream rail faces (57).

* * * * *